May 17, 1966  A. S. LAMBURN  3,251,247
DRIVE TRANSMISSION DEVICES AND, IN PARTICULAR, TO
PLANETARY DRIVE TRANSMISSION DEVICES
Filed Oct. 15, 1962  3 Sheets-Sheet 1

# United States Patent Office 3,251,247
Patented May 17, 1966

3,251,247
DRIVE TRANSMISSION DEVICES AND, IN PARTICULAR, PLANETARY DRIVE TRANSMISSION DEVICES
Alan S. Lamburn, Via Lechlade, England
Filed Oct. 15, 1962, Ser. No. 230,620
10 Claims. (Cl. 74—751)

The invention relates to a drive transmission device of the kind including a friction engaging member controlled by a servo-means and, in particular, it relates to a change-speed planetary drive transmission device including a sun wheel, a planet wheel, an annulus wheel and an axially-movable friction engaging member adapted to engage a coacting friction engageable surface whereby to provide gear ratio of the device.

An object of the invention is to provide a drive transmission device, of the kind set forth, in which the force of engagement of the friction engaging member is prevented from being excessive for transmitting the torque applied to the device.

According to the invention a drive transmission device, of the kind set forth, is provided with means responsive to the torque transmitted by the device and adapted to control the servo-means whereby the force of engagement of the friction engaging member is regulated so as to be at least sufficient for transmitting the torque.

According to one feature the engaging force of the friction engaging member is derived from a spring means whose action is reduced by an opposing force produced by a fluid-operable means so that the resultant engaging force is appropriate for transmitting the torque, the torque-responsive means being adapted to control the pressure of the fluid for operating the fluid-operable means whereby to regulate the engaging force. In such a case the torque-responsive means may be arranged to actuate a variable-pressure relief valve which controls the pressure of the fluid supplied to the fluid-operable means.

According to another feature the torque-responsive means is a member which is moved to different axial positions, in response to torque fluctuations, by the interaction of helical surfaces transmitting at least a predetermined portion of the torque transmitted by the device. In such a case, and where the drive transmission device includes a power-driven shaft connected to drive an input shaft to the friction engaging member through straight-toothed gearing, the torque-responsive means is, according to yet another feature, one of the gears and is mounted from the associated shaft by helical splines so as to be axially movable along its said shaft, against a spring means, commensurately with the torque transmitted. In the case where the drive transmission device includes a power-driven shaft connected to drive an input shaft to the friction engaging member through helically-toothed gearing, one of the helically-toothed gears is mounted, according to a further feature, on straight splines so as to be axially movable along its said splines, against a spring means, commensurately with the torque transmitted.

When the invention is applied to a change-speed planetary drive transmission device including a sun wheel, a planet wheel, an annulus wheel and an axially-movable friction engaging member adapted to engage a coacting friction engageable surface whereby to provide a gear ratio of the device, the torque-responsive means is, according to a yet further feature, the sun wheel which is connected to the movable friction engaging member by helical splines. Alternatively, and according to another feature, the sun wheel may have helical gear teeth and is the torque-responsive means. With a change-speed planetary drive transmission device in which the torque-responsive means is the sun wheel and in the case where the axially-movable friction engaging member may engage either a coacting clutch surface on the annulus element whereby to provide unit ratio or a coacting brake surface on a non-rotary member whereby to provide the planetary ratio, the axially-movable friction engaging member is biased, according to yet another feature, in the direction to engage unit ratio and the non-rotary member may be moved axially in opposition to the bias of the axially-movable friction engaging member whereby to disengage unit ratio and engage planetary ratio, the bias of the axially-movable friction engaging member being controlled by the axial movement of the sun wheel in response to torque fluctuations whereby the force holding the axially-movable friction engaging member engaged either with the annulus element or with the non-rotary member is regulated.

The change-speed planetary drive transmission device may be so arranged that its planet wheel is connected to be driven by a power input shaft and its annulus wheel is connected to drive a power output shaft so that the planetary ratio provides overdrive, or it may be so arranged that its planet wheel is connected to drive a power output shaft and its annulus wheel is connected to be driven by a power input shaft so that the planetary ratio provides underdrive. Such an overdrive or underdrive change-speed planetary transmission device may, of course, form a two-speed gearbox by itself, or may form part of a gearbox having more than two speeds.

The invention is described, by way of example, with reference to the accompanying drawings, in which.

Figure 1:
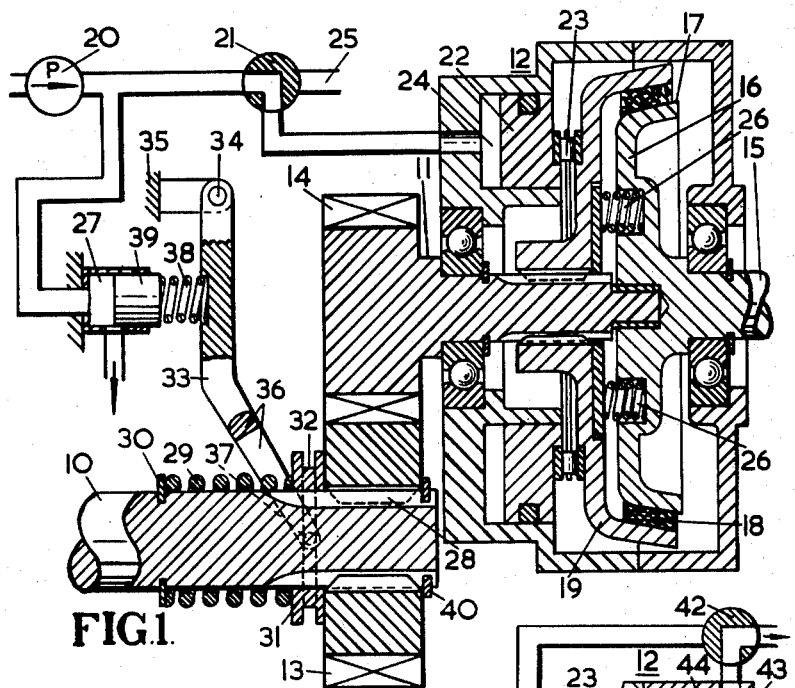
FIGURE 1 is an axial section through one form of drive transmission device.

In the embodiment shown in FIGURE 1, a power-driven shaft 10 drives an input shaft 11 of a friction clutch, indicated generally at 12, through gears 13 and 14. The clutch 12 has an output shaft 5 which is formed integral with a flange 16 having a frusto-conical clutch surface 17 for engagement by the clutch pad 18 of axially-movable clutch member 19. The clutch 12 is arranged to transmit torque from input shaft 11 to output shaft 15 when pressurised fluid from pump 20 is conveyed through control valve 21 to act on annular piston 22 which bears on axially-movable clutch member 19 through thrust race 23. The clutch is disengaged by operating control valve 21 to connect the cylinder 24 of piston 22 to exhaust port 25 so that compression coil springs 26 will urge the axially-movable clutch member 19 away from the flange 16 and break the frictional drive between clutch pad 18 and clutch surface 17.

The maximum torque that the clutch can transmit is a function of the force provided by the piston 22 for engaging the clutch, and this force is a function of the pressure of the fluid supplied from the pump 20. With a conventional drive transmission device, the force of engagement of the clutch is arranged to be sufficient for transmitting the maximum torque that the clutch might be expected to transmit. Thus, when the device is transmitting a torque lower than the maximum torque, the force of engagement of the clutch will be excessive and can cause shocks to be applied to the device when the clutch is engaged. This is particularly the case with ratio-changing clutches in change-speed planetary transmission devices.

This invention prevents shocks, due to the engagement of the clutch by an excessive force, by controlling the force of engagement so that it is just sufficient for transmitting the torque applied to it at any instant.

In FIGURE 1, the pressure of the fluid acting on the piston 22 is determined by a variable-pressure relief valve 27 which is controlled, in a manner that will be described later, so that the pressure of the fluid is directly proportional to the torque that the clutch is required to transmit at any instant. In this manner the force exerted by the piston 22 to hold the clutch engaged is controlled to be just sufficient for transmitting the torque applied to it.

Figure 4:
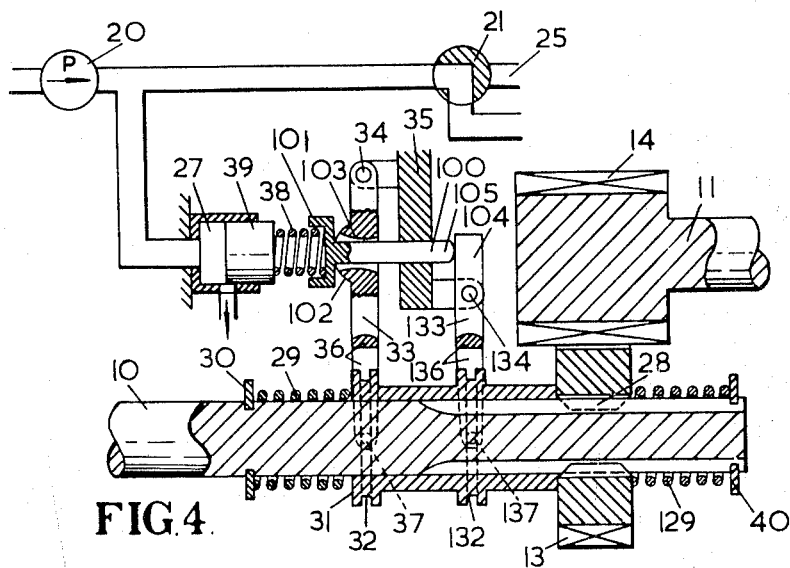
FIGURE 4 illustrates a modification of the torque-responsive means shown in FIGURE 1 whereby torque in either direction can be sensed.

Gear 13 is driven by shaft 10 through splines 28 and is biased to the position shown by a compression coil spring 29 which reacts against a circlip 30. The gears 13 and 14 have helical teeth so that, when torque is transmitted between them in one direction, the end thrust developed by gear 13 causes it to move against the action of the spring 29 until it achieves equilibrium. It will be seen, therefore, that the axial position of the gear 13 will be commensurate with the torque transmitted between the gears in the said one direction. A member 31, having an annular groove 32, is slidably supported between spring 29 and gear 13 so that axial movement of the gear 13 moves the member 31 correspondingly. A lever 33 is pivoted at 34 from a stationary part 35 and has a forked end 36, part of which is shown broken away, and diametrically disposed pins 37 which engage the groove 32 of the member 31. It will therefore be seen that axial movement of the gear 13 will cause the lever 33 to swing about its pivot 34 and will alter the setting of the variable-pressure relief valve 27 by modifying the effort of spring 38 on piston 39. Thus, when the torque transmitted by the gears in the said one direction increases, the effort of the spring 38 will be increased and will cause the pressure of the fluid acting on annular piston 22 to be increased whereby to increase the force of engagement of the clutch so that it is sufficient for transmitting the increased torque. It is to be noted however that this embodiment will only work when torque is transmitted between the gears 13 and 14 in the said one direction. When the direction of this torque is reversed the end thrust developed by gear 13 will also be reversed and it will abut circlip 40. If it is required for the setting of the relief valve 27 to be altered when the torque is transmitted in either direction, it will be necessary to modify the torque-responsive means as shown in FIGURE 4 as will be described later.

Figure 2:
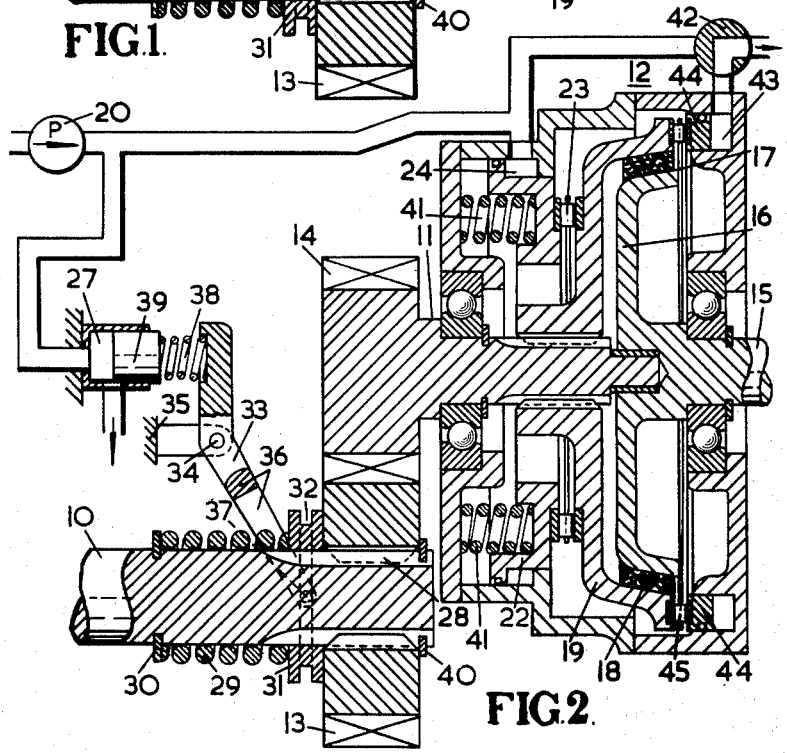
FIGURE 2 is an axial section through another form of drive transmission device.

The embodiment shown in FIGURE 2 is very similar to that shown in FIGURE 1 and corresponding parts have been given the same reference numerals.

The clutch 12 is different in that the axially-movable clutch member 19 is biased towards flange 16 by compression coil springs 41 which provide a force sufficient for transmitting the maximum torque that the clutch will be expected to transmit. Annular piston 22 is arranged to exert a force in opposition to that of the springs 41 so that their resultant force causes engagement of the clutch. The pressure of the fluid is controlled by variable-pressure relief valve 27 so that the force exerted by the piston 22 may be regulated, and consequently the value of the resultant force.

In order for the value of the resultant force to be just sufficient for transmitting the torque applied to the clutch 12 at any instant, it is necessary for the pressure of the fluid supplied to the cylinder 24 to be inversely proportional to the torque that the clutch is required to transmit. To achieve this the lever 33 is modified as shown, so that movement of the gear 13, responsive to an increase of torque, causes the effort exerted by spring 38 on piston 39 to be decreased.

Disengagement of the clutch is effected by operating control valve 42 so that pressurised fluid is conveyed from pump 20 to cylinder 43, whereby to cause annular piston 44 to exert a force on axially-movable clutch member 19 through thrust race 45, the sum of the forces produced by pistons 24 and 44 being arranged to be greater than the net force exerted by the springs 41 so that the clutch member 19 is moved axially away from flange 16 to break the frictional drive between clutch pad 18 and clutch surface 17.

As shown in FIGURE 4, the torque-responsive means of FIGURE 1 may be modified so that the variable-pressure relief valve 27 is operated in the same direction irrespective of the direction of the torque transmitted. In view of the similarity between FIGURES 1 and 4, corresponding components have been given the same reference numerals and may be considered as performing the same functions unless specifically stated to the contrary. The main modification is that the shaft 10 and the splines 28 are extended so that a second compression spring 129 may be arranged between gear 13 and circlip 40. Thus the gear 13 is free to move in either direction in response to the axial force generated by the engagement of its helical teeth with those of gear 14. Member 31 is extended from groove 32 towards gear 13 and is formed with a second groove 132 intermediate groove 32 and gear 13. The lever 33 is pivoted at 34 from a stationary part 35 and has a forked end 36, part of which is shown broken away, and diametrically disposed pins 37 which engage groove 32 in exactly the same manner as described with reference to FIGURE 1. However the lever 33 is modified so that it acts on spring 38 through a plunger 100 which is supported for longitudinal sliding by part 35 and has a recessed head 101 for engaging the spring 38. The lever 33 is provided with a cam 102 for acting on the axial face of head 101, and is formed with a bore 103 through which the plunger 100 passes with clearance irrespective of the swinging of lever 33 about pivot 34. A second lever 133 is pivoted at 134 from part 35 and has a forked end 136, part of which is shown broken away, and diametrically disposed pins 137 which engage groove 132. The end 104 of lever 132 remote from its forked end 136 is arranged to engage the domed end 105 of plunger 100. In operation, when the gear wheel 13 moves to the left from the position shown in FIGURE 4, end 104 of lever 132 is swung out of contact with the domed end 105 of plunger 100, and cam 102 of lever 33 moves the plunger 100 to the left to increase the loading of spring 38 commensurately with the said movement of gear wheel 13 to the left and thus commensurately with the torque transmitted. When the gear wheel 13 moves to the right from the position shown in FIGURE 4, the cam 102 of lever 33 is swung out of contact with head 101 of plunger 100, and the end 104 of lever 132 acts on the domed end 105 to move the plunger 100 to the left to increase the loading of spring 38 commensurately with the said movement of the gear 13 to the right and thus commensurately with the torque transmitted. It will accordingly be appreciated that the mechanism illustrated in FIGURE 4 increases the loading of spring 38 commensurately with the torque transmitted irrespective of the direction of said torque. The gear 14 is connected to drive a clutch 17 through shaft 11 in the same manner as shown in FIGURE 2. Preferably the gear 14 is formed axially longer than gear 13 to accommodate the axial movement of the latter.

Figure 5:
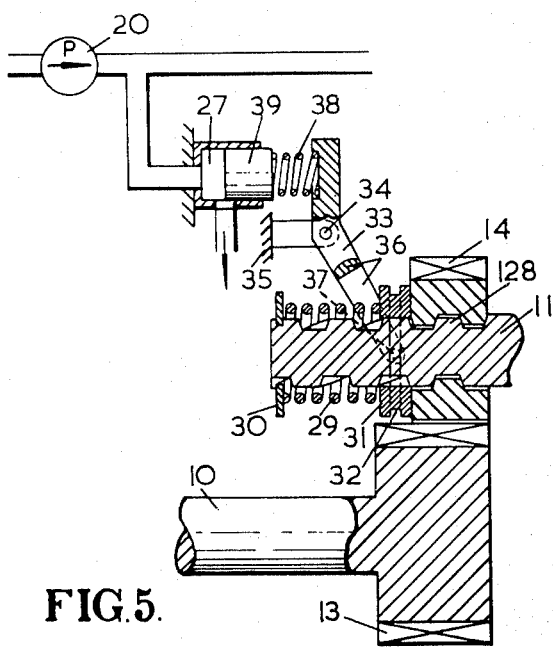
FIGURE 5 illustrates modifications of the torque-responsive means shown in FIGURE 2.

As illustrated in FIGURE 5, the embodiments of both FIGURE 1 and FIGURE 2, may have the gear 14 mounted on splines 128, instead of gear 13, and be used to control the relief valve 27 in exactly the same manner that gear 13 does. With the arrangement illustrated in FIGURE 5 the gears 13 and 14 have straight teeth and the gear 14 is mounted from its shaft 11 by helical splines 128 so that it moves axially in response to variations in the torque transmitted between the gear and its shaft. This movement of gear 14 is applied to control the variable-pressure relief valve 27 through a mechanism which is identical to that shown and described with reference to FIGURE 2 and accordingly bears the same reference numerals and may be considered as performing the same function. If desired the teaching of FIGURE 4 may be applied to FIGURE 5 to give a mechanism which increases the loading of spring 38 commensurately with the torque transmitted irrespective of the direction of said torque.

Figure 3:
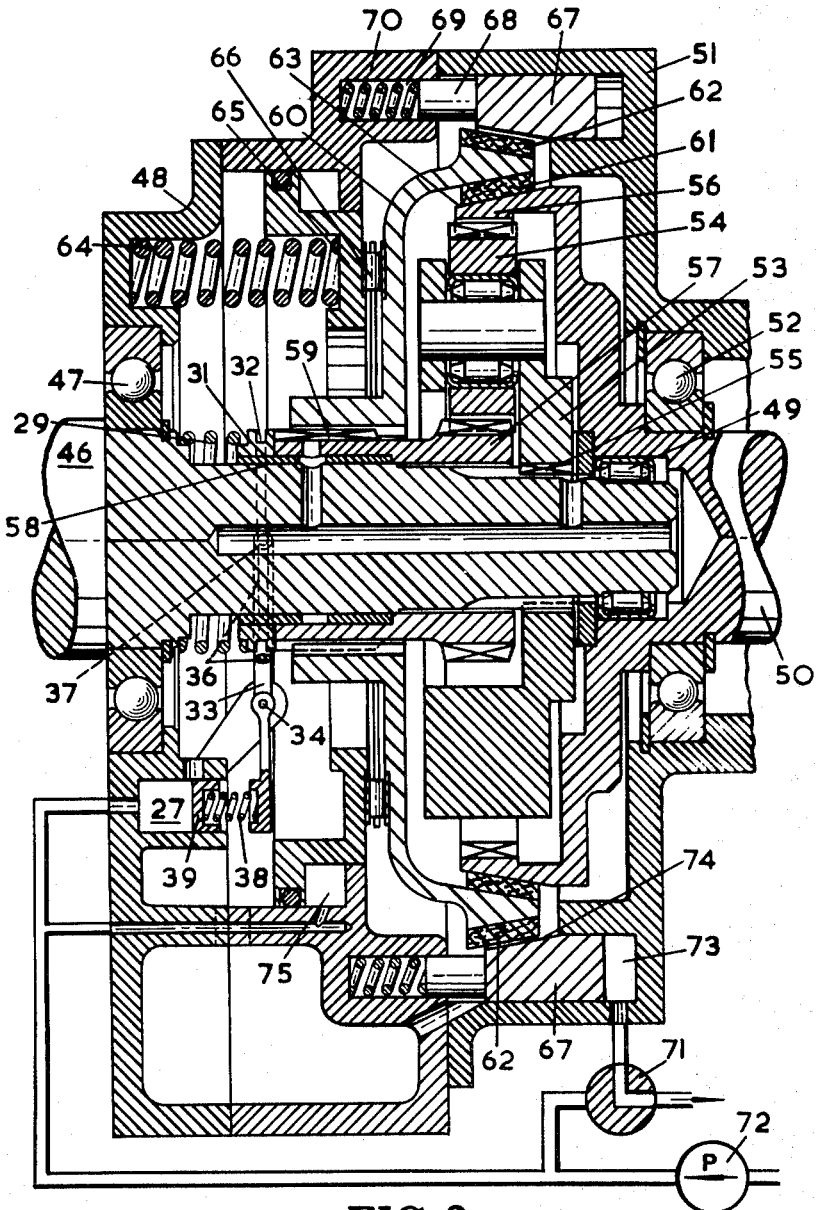
FIGURE 3 is an axial section through a change-speed planetary drive transmission device forming an overdrive.

The change-speed planetary drive transmission device depicted by FIGURE 3 has an input shaft 46 supported by bearing 47 from casing member 48 and by needle roller bearing 49 from an aligned output shaft 50 which is supported from casing member 51 by a bearing 52. A carrier 53, for planet wheel 54, is held rotatively fast with the input shaft 46 by splines 55. The planet wheel 54 meshes with an annulus gear wheel 56, formed integral with the output shaft 50, and with a sun gear wheel 57 freely supported on input shaft 46 by journal bearing 58. The sun wheel 57 has a splined connection 59 with an annular friction engaging member 60 carrying a frusto-conical clutch pad 61 and a frusto-conical brake pad 62 respectively. The friction engaging member 60 can be slid axially on the splines 59 for the clutch pad 61 to engage over a complementary clutch surface 63 of the annulus gear wheel 56, whereby to provide drive transmission at unit ratio.

A plurality of axially-directed compression springs 64 are arranged in a circle about the common axis of the input and output shafts and react between the casing member 48 and an annular piston 65 which bears on the movable friction engaging member 60 through thrust race 66 to engage unit ratio.

An annular piston 67 is arranged radially outside the movable friction engaging member 60 and is prevented from rotation by axially-extending pegs 68 located in bores 69 in casing member 70 which is held rigidly between casing members 48 and 51. When the planetary overdrive ratio is to be selected, control valve 71 is actuated to convey pressurised fluid from pump 72 to cylinder 73 of the annular piston 67. The force exerted by piston 67 is arranged to be sufficient for causing engagement between brake surface 74 and brake pad 62 and for moving friction engaging member 60 against the bias of springs 64 whereby to disengage clutch pad 61 from clutch surface 63.

It will be appreciated that the force of engagement of either clutch pad 61 with clutch surface 63 to provide unit ratio, or brake pad 62 with brake surface 74 to provide planetary ratio, will be equal to the force exerted on friction engaging member 60 by annular piston 65.

The force exerted by annular piston 65 is controlled by supplying pressurised fluid from pump 72 to cylinder 75 whereby to exert a force in opposition to that exerted by springs 64. Thus, the force of engagement of both unit ratio and planetary ratio can be regulated to be just sufficient for transmitting the torque applied to them by controlling the pressure of the fluid to be inversely proportional to the torque to be transmitted.

The pressure of the fluid supplied from pump 72 is controlled in precisely the same manner as that described with reference to FIGURE 2.

The sun wheel 57, planet wheel 54 and annulus wheel 56 have helically-directed teeth, and the sun wheel 57, beyond its splined connection 59 to the movable friction engaging member 60, abuts a member 31 provided with an annular groove 32 engaged by pins 37 of fork 36 of lever 33 pivoted at 34 to casing member 48 and arranged to vary the effort of spring 38 on piston 39 of variable-pressure relief valve 27. The thrust exerted on the sun wheel 57, by the interaction of its helical teeth with those of the planet wheel 54, causes it to move axially against compression spring 29 until it achieves equilibrium.

The position of the sun wheel 57 is, therefore, commensurate with the torque transmitted from input shaft 46 to output shaft 50, and the lever 33 alters the pressure of the fluid supplied from pump 72 to be inversely proportional to the transmitted torque.

The invention may be applied to underdrive change-speed planetary drive transmission devices. For instance, if the shaft 50 of the device shown in FIGURE 3 were made the input shaft, and the shaft 46 the output shaft, the planetary ratio of the device would provide underdrive.

Referring to FIGURE 3, the sun wheel 57, planet wheel 54 and annulus wheel 56 may be provided with straight teeth instead of helical teeth and the end thrust that the sun wheel 57 is required to generate can be provided by making the splines 59 helical.

What I claim as my invention and desire to secure by Letters Patent of the United States is:

1. A drive transmission device including an input shaft adapted to transmit torque from a power source, an output shaft for receiving torque, a friction clutch for transmitting torque from said input shaft to said output shaft, said friction clutch including an axially movable member and a cooperating reaction member, means coupling one of said members to one of said shafts, means operably relating the other of said members with the other of said shafts to effect a driving relation between the shafts when said members are in clutch engaging condition, means for effecting axial movement of said axially movable member between clutch engaging and clutch disengaging conditions, and including servo-means for regulating the force of engagement of said friction clutch, a torque-responsive means adapted to respond to variations in the torque transmitted between said input shaft and said output shaft, said torque-responsive means being arranged to control said servo-means, said servo-means being controlled by said torque-responsive means to effect an increase in said force of engagement of said friction clutch as the torque transmitted increases, and said servo-means being controlled by said torque-responsive means to effect a decrease in said force of engagement of said friction clutch as the torque transmitted decreases whereby said force of engagement of said friction clutch will be at least sufficient for transmitting the torque.

2. A drive transmission device including an input shaft adapted to transmit torque from a power source, an output shaft for receiving torque, a friction clutch for transmitting torque from said input shaft to said output shaft, spring means adapted to exert a force, fluid-operable means adapted to be supplied from a source of pressurised fluid, said fluid-operable means being arranged to exert a force in opposition to said force exerted by said spring means, means for applying the resultant of said forces to hold said friction clutch engaged, servo-means for controlling the pressure of said pressurised fluid whereby to regulate the force of engagement of said friction clutch, a torque-responsive means adapted to respond to variations in the torque transmitted between said input shaft and said output shaft, said torque-responsive means arranged to control said servo-means, said servo-means being controlled by said torque-responsive means to increase said resultant force as the torque transmitted increases, and said servo-means being controlled by said torque-responsive means to decrease said resultant force as the torque transmitted decreases whereby said force of engagement of said friction clutch will be at least sufficient for transmitting the torque.

3. A drive transmission device including an input shaft adapted to transmit torque from a power source, an output shaft for receiving torque, a friction clutch for transmitting torque from said input shaft to said output shaft, spring means adapted to exert a force, fluid-operable means adapted to be supplied from a source of pressurised fluid, said fluid-operable means being arranged to exert a force in opposition to said force exerted by said spring means, means for applying the resultant of said forces to hold said friction clutch engaged, relief valve means arranged to control the pressure of said pressurised fluid, control means associated with said relief valve means for regulating the pressure at which said relief valve means controls the pressure of said pressurised fluid whereby to regulate the force of engagement of said friction clutch, a torque-responsive means adapted to respond to variations in the torque transmitted between said input shaft and said output shaft, said torque-responsive means being arranged to actuate said control means of said relief valve means, said relief valve means being actuated by said torque-responsive means to increase said resultant force as the torque transmitted increases, and said relief valve means being actuated by said torque-responsive means to decrease said resultant force as the torque transmitted decreases whereby said force of engagement of said friction clutch will be at least sufficient for transmitting the torque.

4. A drive transmission device including an input shaft adapted to transmit torque from a power source, an output shaft for receiving torque, a friction clutch for transmitting torque from said input shaft to said output shaft, said friction clutch including an axially movable member and a cooperating reaction member, means coupling one of said members to one of said shafts, means operably relating the other of said members with the other of said shafts to effect a driving relation between the shafts when said members are in clutch engaging condition, means for effecting axial movement of said axially movable member between clutch engaging and clutch disengaging conditions, and including servo-means for regulating the force of engagement of said friction clutch, a first member having helical surfaces formed thereon, a second member having helical surfaces formed thereon, said helical surfaces of said first member being engaged with said helical surfaces of said second member and being adapted to transmit at least a predetermined portion of the torque transmitted by the device, said second member being adapted to be moved by the interaction of its helical surfaces with said helical surfaces of said first member in response to variations in the torque transmitted between said input shaft and said output shaft, said movement of said second member being arranged to control said servo-means, said servo-means being controlled by said movement of said second member to effect an increase in said force of engagement of said friction clutch as the torque transmitted increases, and said servo-means being controlled by said movement of said second member to effect a decrease in said force of engagement of said friction clutch as the torque transmitted decreases whereby said force of engagement of said friction clutch will be at least sufficient for transmitting the torque.

5. A drive transmission device including an input shaft adapted to transmit torque from a power source, straight-toothed gearing arranged to be driven by said input shaft, an output shaft for receiving torque, a friction clutch for transmitting torque from said straight-toothed gearing to said output shaft, said friction clutch including an axially movable member and a cooperating reaction member, means coupling one of said members to one of said shafts, means operably relating the other of said members with the other of said shafts to effect a driving relation between the shafts when said members are in clutch engaging condition, means for effecting axial movement of said axially movable member between clutch engaging and clutch disengaging conditions, and including servo-means for regulating the force of engagement of said friction clutch, one of said straight-toothed gears formed with helical torque-transmitting surfaces and adapted to move axially in response to variations in the torque transmitted between said input shaft and said output shaft, said axial movement of said one of said straight-toothed gears being arranged to control said servo-means, said servo-means being controlled by said axial movement to effect an increase in said force of engagement of said friction clutch as the torque transmitted increases, and said servo-means being controlled by said axial movement to effect a decrease in said force of engagement of said friction clutch as the torque transmitted decreases whereby said force of engagement of said friction clutch will be at least sufficient for transmitting the torque.

6. A drive transmission device including an input shaft adapted to transmit from a power source, helically-toothed gearing arranged to be driven by said input shaft, an output shaft for receiving torque, a friction clutch for transmitting torque from said helically toothed gearing to said output shaft, said friction clutch including an axially movable member and a cooperating reaction member, means coupling one of said members to one of said shafts, means operably relating the other of said members with the other of said shafts to effect a driving relation between the shafts when said members are in clutch engaging condition, means for effecting axial movement of said axially movable member between clutch engaging and clutch disengaging conditions, and including servo-means for regulating the force of engagement of said friction clutch, one of said helically-toothed gears being adapted to move axially in response to variations in the torque transmitted between said input shaft and said output shaft, said axial movement of said one of said helically-toothed gears being arranged to control said servo-means, said servo-means being controlled by said axial movement to effect an increase in said force of engagement of said friction clutch as the torque transmitted increases, and said servo-means being controlled by said axial movement to effect a decrease in said force of engagement of said friction clutch as the torque transmitted decreases whereby said force of engagement of said friction clutch will be at least sufficient for transmitting the torque.

7. A planetary drive transmission device including an input shaft adapted to transmit torque from a power source, an output shaft for receiving torque, a sun wheel element, an annulus wheel element, a planet wheel meshing with said sun wheel element and said annulus wheel element, a planet carrier supporting said planet wheel, a group of elements comprising said sun wheel element and said annulus wheel element, an axially-movable friction engaging member, one element of said group being rotatively-fast with said friction engaging member, the other element of said group being drivingly-connected to one of said shafts, said planet carrier being drivingly-connected to the other of said shafts, a rotatively-stationary member defining a brake surface for coaction with said axially-movable friction engaging member, a member defining a clutch surface for coaction with said axially-movable friction engaging member, said member defining said clutch surface being rotatively-fast with one of said shafts, means adapted optionally to effect relative movement between said axially movable friction engaging member and said brake surface to effect engagement of said axially movable member with said brake surface for said input shaft to transmit torque to said output shaft at a planetary ratio, means for effecting relative movement between said axially movable friction engaging member and said clutch surface to effect engagement of said axially movable friction engaging member with said clutch surface for said input shaft to transmit torque to said output shaft at unit ratio, one of said last two-mentioned means including servo-means for regulating the force of engagement of said axially-movable friction engaging member with at least one of said surfaces, a torque-responsive means adapted to respond to variations in the torque transmitted between said input shaft and said output shaft, said torque-responsive means being arranged to control said servo-means, said servo-means being controlled by said torque-responsive means in a manner to effect an increase in said force of engagement of said friction engaging member with said one surface as the torque transmitted increases, and said servo-means being controlled by said torque-responsive means in a manner to effect a decrease in said force of engagement of said friction engaging member with said one surface as the torque transmitted decreases, whereby said force of engagement of said axially-movable friction engaging member with said one surface will be at least sufficient for transmitting the torque.

8. A planetary drive transmission device including an input shaft adapted to transmit torque from a power source, an output shaft for receiving torque, a helically-toothed sun wheel element, a helically-toothed annulus wheel element, a helically-toothed planet wheel meshing with said sun wheel element and said annulus wheel element, a planet carrier supporting said planet wheel, a group of elements comprising said sun wheel element and said annulus wheel element, an axially-movable friction engaging member, one element of said group being rotatively-fast with said friction engaging member, the other element of said group being drivingly-connected to one of said shafts, said planet carrier being drivingly-connected to the other of said shafts, a rotatively-stationary member defining a brake surface for coaction with said axially-movable friction engaging member, a member defining a clutch surface for coaction with said axially-movable friction engaging member, said member defining said clutch surface being rotatively-fast with one of said shafts, means adapted optionally to effect relative movement between said axially movable friction engaging member and said brake surface to effect engagement of said axially movable member with said brake surface for said input shaft to transmit torque to said output shaft at a planetary ratio, means for effecting relative movement between said axially movable friction engaging member and said clutch surface to effect engagement of said axially movable friction engaging member with said clutch surface for said input shaft to transmit torque to said output shaft at unit ratio, one of said last two-mentioned means including servo-means for regulating the force of engagement of said axially-movable friction engaging member with at least one of said surfaces, said helically-toother sun wheel element being adapted to move axially in response to variations in the torque transmitted between said helically-toothed sun wheel element and said helically-toothed planet wheel, said axial movement of said helically-toothed sun wheel element being arranged to control said servo-means, said servo-means being controlled by said axial movement to effect an increase in said force of engagement of said friction engaging member with said one surface as the torque transmitted increases, and said servo-means being controlled by said axial movement to effect a decrease in said force of engagement of said friction engaging member with said one surface as the torque transmitted decreases whereby said force of engagement of said axially-movable friction engaging member with said one surface will be at least sufficient for transmitting the torque.

9. A planetary drive transmission device including an input shaft adapted to transmit torque from a power source, an output shaft for receiving torque, a straight-toothed sun wheel element, a straight-toothed annulus wheel element, a straight-toothed planet wheel meshing with said sun wheel element and said annulus wheel element, a planet carrier supporting said planet wheel, a group of elements comprising said sun wheel element and said annulus wheel element, an axially-movable friction engaging member, helical splines formed on one member of said group, helical splines formed on said axially-movable friction engaging member, said helical splines of said one element of said group being engaged with said helical splines of said axially-movable friction engaging member, the other element of said group being drivingly-connected to one of said shafts, said planet carrier being drivingly-connected to the other of said shafts, a rotatively-stationary member defining a brake surface for coaction with said axially-movable friction engaging member, a member defining a clutch surface for coaction with said axially-movable friction engaging member, said member defining said clutch surface being rotatively-fast with one of said shafts, means adapted optionally to effect relative movement between said axially movable friction engaging member and said brake surface to effect engagement of said axially movable member with said brake surface for said input shaft to transmit torque to said output shaft at a planetary ratio, means for effecting relative movement between said axially movable friction engaging member and said clutch surface to effect engagement of said axially movable friction engaging member with said clutch surface for said input shaft to transmit torque to said output shaft at unit ratio, one of said last two-mentioned means including servo-means for regulating the force of engagement of said axially-movable friction engaging member with at least one of said surfaces, said straight-toothed sun wheel element being adapted to move axially in response to variations in the torque transmitted between said helical splines of said straight-toothed sun wheel element and said helical splines of said axially-movable friction engaging member, said axial movement of said straight-toothed sun wheel element being arranged to control said servo-means, said servo-means being controlled by said axial movement to effect an increase in said force of engagement of said friction engaging member with said one surface as the torque transmitted increases, and said servo-means being controlled by said axial movement to effect a decrease in said force of engagement of said friction engaging member with said one surface as the torque transmitted decreases whereby said force of engagement of said axially-movable friction engaging member with said one surface will be at least sufficient for transmitting the torque.

10. A planetary drive transmission device including an input shaft adapted to transmit torque from a power source, an output shaft for receiving torque, a sun wheel, an annulus wheel, a planet wheel meshing said sun wheel and said annulus wheel, a planet carrier supporting said planet wheel, said planet carrier being drivingly connected to one of said shafts, said annulus wheel being drivingly connected to the other of said shafts, an axially-movable friction engaging member, a rotatively-stationary member defining a brake surface, splines formed on said axially-movable friction engaging member, splines formed on said sun wheel, said splines of said axially-movable friction engaging member being engaged with said splines of said sun wheel, said annulus wheel defining a clutch surface, said axially-movable friction engaging member being adapted to engage said clutch surface of said annulus whereby to provide transmission between said input shaft and said output shaft at unit ratio, means supporting said rotatively-stationary member for axial sliding, selectively-operable means for moving said rotatively-stationary member axially towards said axially-movable friction engaging member, said brake surface of said rotatively-stationary member being adapted to engage said axially-movable friction engaging member when said selectively-operable means is operated whereby to disengage said axially-movable friction engaging member from said clutch surface of said annulus and to provide transmission between said input shaft and said output shaft at the planetary ratio, spring means adapted to exert a force on said axially-movable friction engaging member, fluid-operable means adapted to be supplied from a source of pressurised fluid whereby to exert a force on said axially-movable friction engaging member in opposition to said force exerted by said spring means, the resultant of said forces holding said axially-movable friction engaging member engaged with one of said brake and clutch surfaces, relief valve means arranged to control the pressure of said pressurised fluid, control means associated with said relief valve means for regulating the pressure at which said relief valve means controls the pressure of said pressurised fluid whereby to regulate the force of engagement of said axially-movable friction engaging member with said one surface, a torque-responsive means adapted to respond to variations in the torque transmitted between said input shaft and said output shaft, said torque-responsive means being arranged to actuate said control means of said relief valve means, said relief valve means being actuated by said torque-responsive means to increase said resultant force as the torque transmitted increases, and said relief valve means being actuated by said torque-responsive means to decrease said resultant force as the torque transmitted decreases whereby the force of engagement of said axially-movable friction engaging member with whichever surface it is engaged will be at least sufficient for transmitting the torque.

References Cited by the Examiner

UNITED STATES PATENTS

| | | | |
|---|---|---|---|
| 1,780,293 | 11/1930 | Christie et la. | 74—781 |
| 2,136,971 | 11/1938 | Fleischel | 74—781 |
| 2,187,835 | 1/1940 | Martin | 192—85 |
| 2,364,019 | 11/1944 | Beall | 192—54 |
| 2,624,432 | 1/1953 | Randol | 192—077 |
| 2,642,971 | 6/1953 | Hagenbook | 192—85 |
| 2,654,269 | 10/1953 | Wilson | 74—781 X |
| 2,766,864 | 10/1956 | Schilling et al. | 192—54 |
| 2,954,856 | 10/1960 | Strawn | 192—54 |

FOREIGN PATENTS 336,560  10/1930  Great Britain.

DON A. WAITE, *Primary Examiner.*

DAVID J. WILLIAMOWSKY, *Examiner.*